United States Patent [19]

Andrew et al.

[11] Patent Number: 5,428,403
[45] Date of Patent: Jun. 27, 1995

[54] MOTION VECTOR ESTIMATION, MOTION PICTURE ENCODING AND STORAGE

[75] Inventors: Derek Andrew, Charlwood; Octavius J. Morris, Redhill, both of United Kingdom

[73] Assignee: U.S. Philips Corporation, New York, N.Y.

[21] Appl. No.: 954,732

[22] Filed: Sep. 30, 1992

[30] Foreign Application Priority Data

Sep. 30, 1991 [GB] United Kingdom ................. 9120739
Aug. 19, 1992 [GB] United Kingdom ................. 9217742

[51] Int. Cl.$^6$ ............................................. H04N 7/50
[52] U.S. Cl. ................................ 348/699; 348/402; 348/413
[58] Field of Search ................. 348/699, 402, 413, 416

[56] References Cited

U.S. PATENT DOCUMENTS 4,785,349 11/1988 Keith ................................... 348/390

FOREIGN PATENT DOCUMENTS 3733038 4/1989 Germany ..................... H04N 7/137

OTHER PUBLICATIONS

D. Le Gall, "MPEG: A Video Compression Standard for Multimedia Applications, Communication of the ACM", vol. 34, No. 4, Apr. 1991, pp. 47–58.

G. De Haan et al., "Motion Estimator For TV-picture Enhancement", Fourth Annual Workshop on HDTV, Turin, Sep. 1991.

Yang et al., "A Family of VLSI Designs for the Motion Compensation Block-Matching Algorithm", IEEE Trans. on Circuits and Systems, vol. 36, No. 10, Oct. 1989, pp. 1317–1325.

L. G. Chen et al.: "A Predictive Parallel Motion Estimation Algorithm For Digital Imaging Processing", IEEE Procc. IDDC 1991, pp. 617–620.

L. G. Chen et al., "An Efficient Paralle Motion Estimation Algorithm For Digital Image Processing", IEEE Trans. Circuits and Systems for Video Technology, vol. 1, No. 4, (Dec. 1991) pp. 378–385.

Primary Examiner—Howard W. Britton
Attorney, Agent, or Firm—Michael E. Marion

[57] ABSTRACT

In the encoding of a frame (P3) in a digitised motion picture sequence, the frame is divided into blocks (A) of pixels and a motion vector (VA) found to predicts the contents of each block A from a block (A') in a previous frame (I0). Rather than evaluate many thousands of candidate vectors to find the best motion vector (VA), relatively few candidate vectors are evaluated, based on starting vector which is the estimated motion vector for a neighbouring block (LB(A)) in the same frame. To allow parallel processing of several pixel blocks, all the blocks of one row in the current frame are assigned to one processor (DSP), and a starting vector is obtained from a block (LB(A)) previously processed by the same processor. Further starting vectors are obtained if desired from neighbouring blocks (UR(B),DR(B)) in neighbouring frames of the sequence. The candidate vectors based on a starting vector may be very few in number, or may fill an area a few percent of the full search area. The method may favor candidate vectors which are more economical to encode.

13 Claims, 3 Drawing Sheets

MOTION VECTOR ESTIMATION, MOTION PICTURE ENCODING AND STORAGE

BACKGROUND OF THE INVENTION

The invention relates to a method of estimating motion vectors for blocks of pixels in a frame of a digitised motion picture sequence, the method comprising, for each given block of pixels performing a vector search based around at least one starting vector derived from a previously estimated vector for a pixel block which is a neighbour in space and/or time of the given pixel block.

The techniques of motion vector estimation can be used to improve compression of motion picture data by reducing the temporal redundancy in the picture information, in a manner analogous to that in which well-known differential coding and transform coding techniques eliminate spatial redundancy for the compression of still picture data.

The International Standards Organisation has issued a Committee Draft Standard ISO 11172, well-known the art as the. MPEG specification and incorporated herein by reference. MPEG specifies a format for the encoding of compressed motion picture data, including motion vectors. An overview of the MPEG coding standard is provided by D. Le Gall in 'MPEG: A Video Compression Standard for Multimedia Applications', Comm. of the ACM, Vol. 34, No. 4, April 1991. MPEG encoding allows the reproduction of full-motion video from a data stream of only 1.2 Mbits per second, a rate low enough for the reproduction of video from MPEG data stored on a Compact Disc (CD-ROM), or received via some other data channel of similar bandwidth.

The MPEG specification provides for motion compensation by dividing a frame into blocks of 16×16 pixels, and assigning to each a motion vector in the range ±64 pixels in the x (horizontal) and y (vertical) dimensions, to half-pixel precision. This will be explained in more detail below with reference to FIG. 1 of the drawings. The MPEG specification does not specify how the motion vectors are to be obtained, only how they are to be represented. A full search for the most accurate motion vector in the range permitted would involve comparing the current pixel block with over 16000 candidate pixel blocks, even at integer pixel precision. Dedicated hardware can be provided for this task, but there is also a need for software implementations that can be used in advance of the general availability of such hardware, and which offer more flexibility to investigate improvements in the vector search and other aspects of the encoding strategy.

A method as set forth in the opening paragraph has been described by G. de Haan and H. Huijgen in their paper 'Motion estimator for TV-picture enhancement', presented at the Fourth International Workshop on PIDTV, Turin, September 1991. That method has been developed for implementation in dedicated hardware and real-time operation, and involves the evaluation of relatively few candidate blocks. The method exploits the fact that, where object features moving in the motion picture sequence are larger than a few pixels blocks, as is generally the case, there is a high degree of correlation between the motion vectors of neighbouring blocks. Thus, by careful selection of starting vectors from among vectors estimated for neighbouring blocks, and by the selection of candidate vectors predicted from the starting vectors, good quality motion estimation can be achieved with relatively few candidate block comparisons. While the known technique can be implemented in software to produce a quicker result than the full search, even using a high speed programmable digital signal processor chip (DSP) the encoding process is still inconveniently slow.

A possibility for increasing the speed exists in theory in the use of available hardware systems comprising several DSPs operating in parallel, each processing a subset of the blocks in each frame. Unfortunately, this speed increase is not readily realisable with the method of de Haan and Huijgen because a given DSP processing a given block may have to wait while other DSPs process neighbouring blocks before the starting vectors for the given block are available.

SUMMARY OF THE INVENTION

It is an object of the invention to enable improved motion vector estimation to be performed using programmable hardware, for example to allow the use of parallel processing to achieve a faster result.

The invention provides in a first aspect a method as set forth in the opening paragraph, characterised in that the estimation of motion vectors for each frame is performed in parallel for at least two ordered subsets of the pixel blocks of the frame, the division and ordering of pixel blocks into the subsets and the selection of the neighbouring pixel block(s) being performed such that, where a neighbouring block whose estimated vector is to be used to predict that of the given block is selected from the same frame as the given block, the said neighbouring block is one of the same subset as the given block and is ordered in the subset so as to precede the given block. In this way, each subset can be processed at full speed, without waiting for results from the processing of blocks in the other subset(s).

Each subset may comprise a row of pixel blocks, the processor estimating motion vectors for the pixel blocks of the row in a predetermined sequence, the motion vector for each given block (disregarding the first block in each row) being predicted by the processor from the motion vector estimated for a block which precedes the given block in the said sequence. The rows may be horizontal or vertical, but a horizontal bias to the search may be advantageous since horizontal motion is predominant in typical motion picture sequences. A set of n processors may each take every n-th row of blocks in the image frame. Alternatively, each processor may take the next unprocessed row in the frame whenever it has finished a row of pixel blocks. Many other arrangements are of course possible.

In preferred embodiments of the method, for each given pixel block at least one further prediction of the motion vector is based on a motion vector estimated for a pixel block in a neighbouring frame in the motion picture sequence. By this means starting vectors can be chosen from neighbouring blocks effectively surrounding the given block, which improves the accuracy of the estimated motion vectors when object features move over the given block from a wide range of directions. It will be appreciated by those skilled in the art that the terms 'neighbouring' and 'preceding' as used herein with reference to frames, blocks or pixels cannot be interpreted as referring only to strictly adjacent frames, blocks or pixels. In an MPEG encoding embodiment, for example, it is clear that 'neighbouring' frames may be separated at least by a number of frame intervals of the same order of magnitude as the batch size In a particular embodiment, the predictions for each given pixel block (disregarding the first block in each subset) are based on motion vectors estimated previously for:

the said neighbouring block in the same subset as the given block; and two blocks in a neighbouring frame occupying spatial positions relative to the given block so as to define with the said preceding block in the same subset as the given block a triangular distribution generally surrounding the given block.

In the prediction of a motion vector on the basis of the at least one starting vector, it may be for example that matching between the given block and a block in a previous frame is measured for an array of from 5 to 10 candidate vectors distributed around the starting vector. The candidate vectors may in particular be distributed within a few pixels of the starting vector, perhaps with a horizontal bias, and may include the starting vector itself.

It will often be the case, in the known method as well as in a method embodying the invention as described above, that a good set of starting vectors is not available, and perhaps only a single default starting vector is available for the given block. Such cases arise at the edges of the frames of pixel data, and also when encoding the first predicted frame of a sequence, for example following a scene change. Although such cases are in the minority, a full vector search may still be prohibitively time consuming.

The invention accordingly provides, in a second aspect, a method of estimating a motion vector for a given block of pixels in a frame of a digitised motion picture sequence, by performing an evaluation of a plurality of candidate vectors based around a starting vector, characterised in that the candidate vectors surround the starting vector and are evaluated in an ordered series of generally increasing distance from the starting vector. The ordered series of candidate vectors may form a spiral around the starting vector, for example. The area covered by the candidate vectors may be for example an order of magnitude smaller than that required for a full search, but, if the vector estimated for a neighbouring block is used as the starting vector, the process will tend to converge on an accurate motion vector within a few blocks, always assuming that the moving objects are larger than a few blocks.

Moreover, the ordering of the candidate vectors ensures that the best candidate vector will tend to occur sooner rather than later in the sequence, and various checks can be implemented when evaluating candidate vectors so as to terminate the evaluation of candidate vectors once the best candidate, or at least a "good enough" candidate has been found.

It is a further object of the invention to improve generally the motion picture quality encoded by a stream of motion-compensated image data.

In a third aspect, the invention provides a method of estimating a motion vector for a given block of pixels in a frame of a digitised motion picture sequence, which estimated vector is to be encoded in a data steam encoding the motion picture sequence, the method comprising:

generating a set of candidate vectors for evaluation;

evaluating the quality of prediction provided by each of the candidate vectors; and comparing the results of said evaluations to select one of the candidate vectors as the estimated vector for encoding in a stream of data encoding the motion picture sequence, wherein the amount of data required to encode the estimated motion vector is dependent on the value of the estimated motion vector and wherein the selection of the estimated vector from among the candidate vectors depends not only on the quality of prediction provided by each candidate, but also on the amount of data required to encode each candidate in a data stream, such that the candidate vector selected is not the one providing the highest quality of prediction, if it is determined that another one of the candidate vectors can be encoded in less data while providing a prediction quality which is within a pre-determined threshold of the highest prediction quality.

This third aspect of the invention enables an overall improvement in the quality of motion pictures encoded within a bit stream at a limited data rate. If the quality threshold is set appropriately, the bit stream capacity which has been freed by more economical coding of the selected motion vector can be used to improve the encoding quality of other parts of the picture sequence, even if some of the freed capacity is required for increased error information resulting from the selection of a motion vector which does not quite give the best prediction for a given block. Of course, use of the invention in its third aspect is not limited to any combination with the other aspects of the invention.

As a particular example, the MPEG coding standard provides a special format for encoding blocks which have the zero vector as their motion vector. In some circumstances a zero vector does not have to be encoded at all. In certain picture sequences, including for example cartoon animation sequences, it has been found that a significant amount of bit stream capacity is "wasted" when conventional encoders seek to encode "best" motion vectors for a large number of blocks representing, say, uniform blue sky. For such blocks, the only change from frame to frame in fact comprises only random noise superimposed upon the plain coloured area. It has been found that for these sequences the invention in its third aspect can lead to great savings in bit stream capacity, and hence great improvements in overall picture quality, when the quality threshold is set just high enough that the encoder will ignore the random noise motion information.

The invention still further provides methods and apparatuses for performing motion vector estimation, and for encoding and storing motion picture sequences. These and further advantageous techniques and features will be apparent to the skilled reader in the following description of specific embodiments of the invention.

BRIEF DESCRIPTION OF THE DRAWINGS

Embodiments of the invention will now be described, by way of example, with reference to the accompanying drawings, in which.

DETAILED DESCRIPTION OF THE INVENTION

The embodiment to be described encodes digitised video images for storage and reproduction in accordance with the MPEG decoder specification, cited above. Within this specification, there are many layers of compression encoding and much flexibility for improved encoding strategies to provide greater image quality and/or compression, and the present description is concerned chiefly with improvements in the method of motion vector estimation, which will not be defined in the standard. For full details of the MPEG coding system, reference can be made to the MPEG specification or the article by Le Gall, both cited above.

Figure 1:
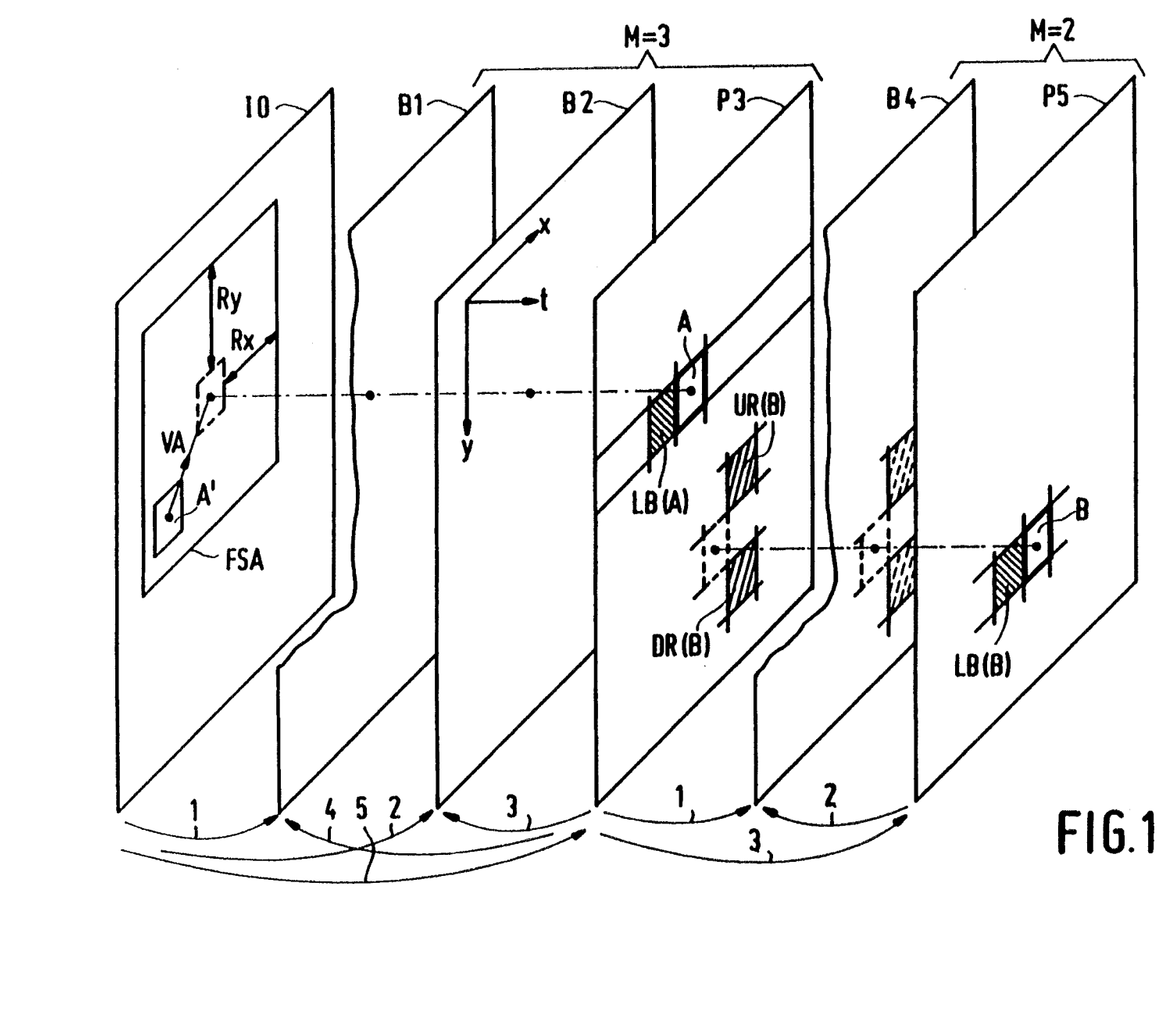
FIG. 1 illustrates the problem of motion vector estimation in the MPEG coding system.

FIG. 1 illustrates certain steps in the motion vector estimation for a sequence of five frames I0,B1,B2,P3,B4,P5 of pixel data which form part of a motion picture sequence to be encoded. MPEG defines three types of frames, with different degrees of motion compensated compression. The sequence (any sequence) begins with an I-typeframe (intrapicture) I0, which is coded with reference only to itself, and relies on no information from neighbouring frames. The sequence continues with 'batches' of predicted frames, including B-type (bidirectional predicted) frames and P-type frames (predicted).

The batch size M can vary typically from one to four frames, and each batch comprises (M-1) B frames followed by a P frame. Thus in the example sequence of FIG. 1, frames B1,B2,P3 form a batch of M=3 frames, while frames B4 and P5 form a second batch with M=2. It will be apparent that a batch with M=1 comprises a single P-type frame. The arrows at the foot of FIG. 1 indicate that each P frame is to be 'forward predicted' from the preceding I or P frame, while each B frame is to be both forward and backward predicted from the I and/or P frames on either side.

The principle of motion compensated prediction will now be described briefly, with reference to the forward prediction of frame P3. Each frame to be predicted is divided into an array of blocks of 16×16 pixels, represented (on an enlarged scale) by the block A in frame P3. Having encoded the starting or reference frame I0 for the sequence, the block A is not directly encoded, but rather a motion vector VA is encoded which predicts that the block A is the same as a 16×16 pixel block A' in the reference frame I0. Data compression is thereby achieved by temporal redundancy reduction. Since the two blocks A and A' will not generally be exactly the same, the difference (prediction error) is then also coded with spatial redundancy reduction by the discrete cosine transform technique (DCT), working on smaller blocks of 8×8 pixels.

Thus the first problem faced by the MPEG coder is that of motion vector estimation for each block in the current frame P3: how to identify the block A' in the reference frame (I0) which best matches the current block A, and hence identify the best motion vector VA? MEPG allows motion vectors to take a limited range in x (horizontal pixel dimension) and y (vertical) respectively where in the latest specification these ranges Rx and Ry are both ±64 pixels. This creates a limited forward search area FSA, shown in FIG. 1, in which to locate the best matching block A', but a full search even of this area would require the evaluation of many thousand candidate blocks. For each candidate block, 16×16=256 pixel comparisons must be made, and the squared pixel differences accumulated (for example) to arrive at a mean squared difference value by which to measure the matching of the candidate block. While a full search may be possible with dedicated hardware, it is presently desired as mentioned in the introduction above to implement motion compensated image coding in software, using readily available processing hardware.

Outside the field of MPEG encoding, de Haan and Huijgen, cited above, have developed motion vector estimation methods which measure matching for relatively few candidate blocks, based on the observations (i) that there is generally a correlation between motion vectors of neighbouring blocks and (ii) that subjective image quality can best be maintained if the motion vector field is smooth, rather than accurate. In other words, there is no great loss in subjective picture quality if the estimated motion vectors are constrained to vary only a little from block to block within a frame. Thus, within the large search area FSA, only a few candidate vectors are used for matching, and these candidate vectors are based on starting vectors estimated previously for blocks neighbouring the current block, spatially and/or temporally.

While the techniques of de Haan and Huijgen can be adapted to a software implementation, which operates many times faster than one with a full-search, this is still several hundred times real time, even with a high performance processor. The present inventors have looked to systems of parallel digital signal processor chips (DSPs), such as the ANDROX ICS-400 image processor board, available from ANDROX in Boston, Mass., and illustrated in block form in FIG. 2.

Figure 2:
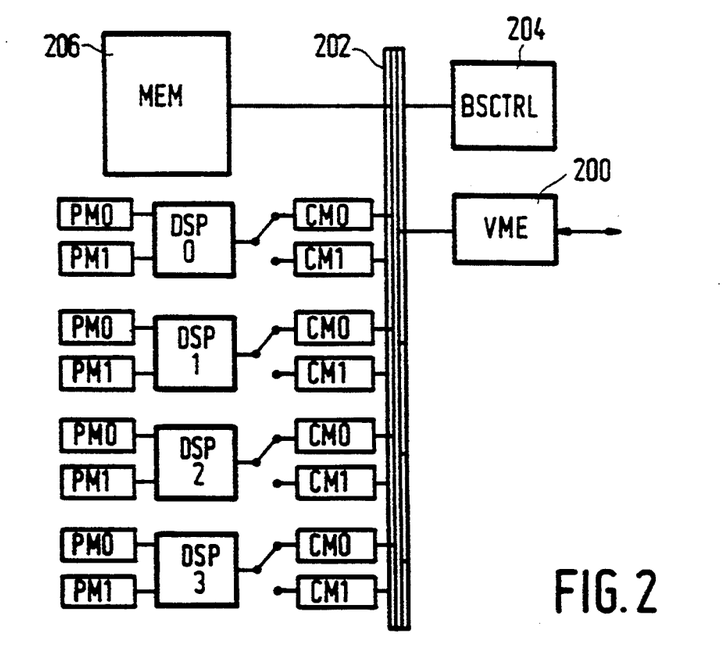
FIG. 2 shows in block form a parallel DSP system suitable for implementing methods embodying the invention.

The system of FIG. 2 comprises a circuit board housing four processors, referenced DSP0 to DSP3, which can be controlled by a host computer system via a VME bus interface unit 200. The board can be housed for example inside a Sun Microsystems or similar workstation-type computer, which provides a convenient and familiar development environment. The VME interface is connected to a high speed bus 202, through which flows all information processed by the DSP system. A bus controller 204 is provided to manage such operations. A memory 206 is connected to the bus for the storage of the video data frames being encoded.

Each processor DSP0-3 is connected to the bus 202 by a pair of cache memories CM0 and CM1. Each cache memory CM0 or CM1 can in practice hold the current block of 16×16 pixel values, together with the pixel values of the search area FSA and other data necessary to estimate a motion vector for the block, although to this end the range (Rx,Ry) of candidate vectors is limited in the present embodiment to (±48,±48). In operation, one cache of the pair is connected to the DSP at a time, while the other cache can be unloaded and reloaded with data for processing via the bus 202. In this way, a constant supply of fresh data is available to keep the respective DSP working full-time. Each DSP further has a pair of program memories PM0 and PM1. Memory PM0 is used to store the program for the DSP, while memory PM1 is used to store temporary values and data which is common to several blocks.

Figure 3:
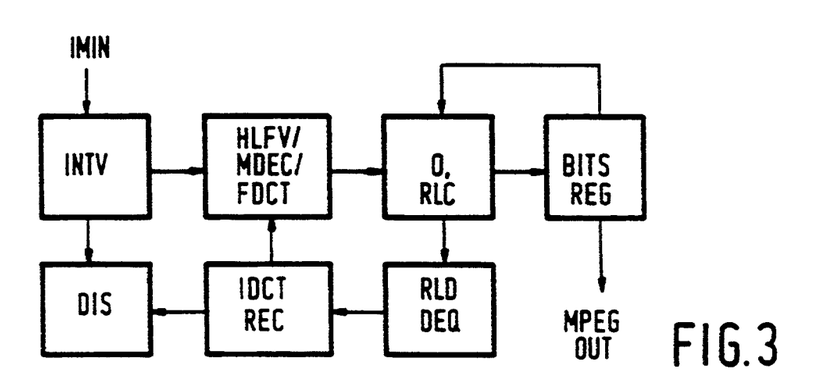
FIG. 3 illustrates the operation of the system of FIG. 2 in accordance with the invention.

FIG. 3 shows briefly in block form how the task of MPEG coding has been partitioned in the present embodiment. Original pixel data for a batch of M frames (plus reference frame) is received at IMIN, and a first module INTV performs the search for motion vectors to integer precision for the whole batch (for example frames B1,B2,P3), using exclusively the original pixel data. Only this first module INTV need be described in any detail for an understanding of the present invention, but the remaining modules will be described briefly as follows. Four modules HLFV/MDEC/FDCT, Q/RLC, RLD/DEQ and IDCT/REC form a main loop of the encoding process. The module HLFV/MDEC/FDCT receives the integer motion vectors and calculates predicted blocks and the resulting prediction errors, making mode decisions and performing the forward DCT compression in accordance with MPEG published recommendations. In this process, the motion vectors are 'fine tuned' to half-pixel precision.

Module Q/RLC quantises and run-length codes the DCT information and passes these to a module BITS/KEG which generates the final MPEG bit stream. The module BITS/REG also provides regulatory feedback to the quantiser module to maintain the output bit rate at the desired value (typically 1.2 Mbits per second). Returning to the main loop, modules RLD/DEQ and IDCT/REC reconstruct the pixel data actually encoded, which is fed back to allow module HLFV/MDEC/FDCT to make correct mode decisions, locate the best half pixel vectors and so forth. Finally a module DIS allows display of tile original or reconstructed pictures.

In the implementation of these modules, the parallel system of four DSPs can only provide a four-fold increase in processing power over a single DSP if all four DSPs are busy all the time. To this end, the ANDROX system is interrupt driven so that each DSP operates independently, but this creates problems for the implementation of the known methods of vector estimation in module INTV, because of the need to predict starting vectors from the vectors of neighbouring blocks. If neighbouring blocks are assigned to different DSPs, and particularly since the estimation may take a shorter time for some blocks than others, there will be times when DSP2, say, requires a starting vector which has yet to be calculated by DSP3. Because of this, much of the potential for parallel processing would remain unexploited.

Figure 4:
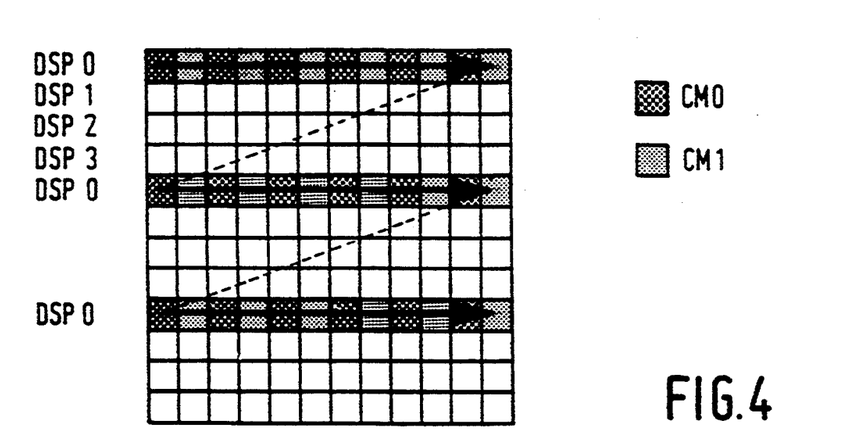
FIG. 4 illustrates the allocation of ordered subsets of pixel blocks between four DSPs in a method embodying the invention.

FIG. 4 shows how the blocks of a frame can be partitioned into ordered subsets, as part of a solution to the above problem. In this embodiment, the blocks are divided into their horizontal rows, and all the blocks of a row are processed, in left to right order, by a single DSP. In the particular embodiment illustrated, every fourth row is processed by the same DSP, with the rows relevant to DSP0 being highlighted in the Figure. In connection with the alternation of usage of the CM0 and CM1 caches, alternate blocks are shaded differently to illustrate which block is processed in which cache. Processing the blocks in horizontal rows is preferred for most natural image sequences, where horizontal motion predominates. There is in principle no reason why the blocks should not be processed in vertical rows (columns), diagonal rows or other sequences.

It will now be explained how the module INTV estimates integer motion vectors, firstly for the blocks of the first batch of frames B1,B2,P3, represented by block A in FIG. 1, and then for the blocks of subsequent batches, represented by block B in frame P5. Two alternative vector search strategies are embodied in the implementation to be described, depending on whether the reference frame (I- or P-type) being used for the current frame has itself been motion predicted. (It may be noted here that I frames are often encoded in a sequence to provide an 'entry points' into the sequence, even though these frames can be motion predicted; for such frames it is in fact advantageous to find motion vectors to enable use of the second search strategy, even though these vectors will not be encoded in the MPEG bit stream). Both strategies rely on the choice of a good starting vector for the search, from which is generated a set of candidate vectors, pointing to a corresponding set of candidate pixel blocks within the reference frame.

Referring now to the vector search for block A, in accordance with the scheme of FIG. 4, the row of blocks containing block A are all processed in left to right order by DSP3. Thus it is guaranteed that the block LB(A) immediately to the left of the current block A on the current frame P3 will have been processed already by DSP3, and an estimated motion vector will thus be available which predicts the block LB(A) from some block in the reference frame I0. This vector can be used as one starting vector on which to base a search for the motion vector that will predict block A from a block A' in frame I0. On the assumption that no motion vectors have been found for the reference frame I0, nor yet the frames B1 and B2, a limited area-search strategy is used for the blocks of frame P3, as illustrated by FIG. 5.

Figure 5:
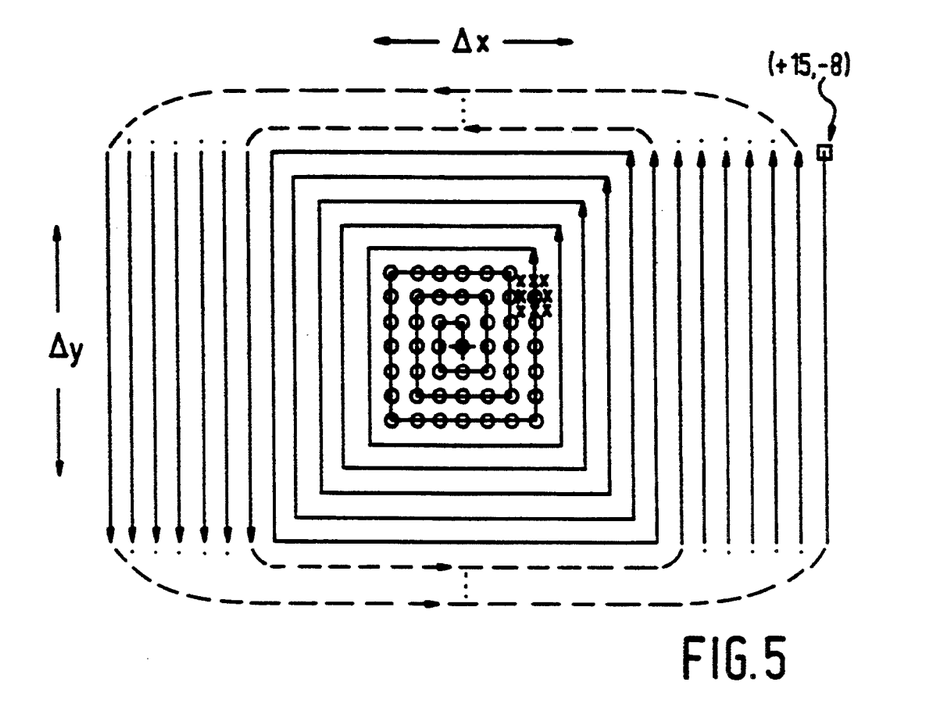
FIG. 5 illustrates the generation of a set of candidate vectors in accordance with a first search strategy.

FIG. 5 shows a spiral search pattern which, on the integer pixel grid, extends ±15 pixels in the horizontal direction ($\Delta x$) and ±8 pixels vertically ($\Delta y$). This horizontal bias is provided in recognition of the fact that horizontal motion predominates in a typical motion picture sequence, as mentioned above. The program memory PM1 of the relevant DSP contains an ordered list of offset pairs ($\Delta x, \Delta y$) which define a set of candidate vectors 'o' relative to a starting vector, indicated by '+' at offset (0,0). The sequence of candidate vectors 'o' spirals generally outward from the starting vector at '+' to fill the search area up to $(\Delta x, \Delta y) = (\pm 15, \pm 8)$. In this way, even with a single starting vector, 527 candidate vectors 'o' are defined. Each candidate vector in turn identifies a candidate block in the reference frame I0 to be compared with the current block A which it desired to predict.

For each block in the fourth row of blocks in the frame P3 to be predicted, the DSP must therefore identify a starting vector. For the first block in a row, the zero vector (0,0) is used as a default starting vector, but thereafter the vector just estimated for the block LB(A) to the left of the current block is used as the starting vector. This brings important benefits since in most cases there will be a high degree of coherence between neighbouring vectors in the vector field. Having identified the starting vector '+', the stored sequence of offsets can be used to generate the set of 527 candidate vectors 'o' in the spiral sequence.

For each candidate vector 'o', the current block A in frame P3 is compared with a candidate block in reference frame I0 whose spatial position (x,y) is given by the candidate vector relative to the spatial position (x,y) of the origin of the current block. The comparison is performed pixel by pixel in principle for all 256 pixels in the block, accumulating to a mean squared difference (or other value measuring the degree of similarity between the blocks), until the best matching candidate block is identified. It may be noted, however, that a candidate block can in principle be rejected as soon as the accumulated difference exceeds the difference found for the best candidate block tried so far, resulting in a considerable saving of time. Since checking the accumulated squared difference against the best so far will generally occupy at least one cycle of the DSP's time, to make such a check after every pixel would slow down the entire matching process. A good compromise has been found in an embodiment where the accumulated squared difference is checked against the best so far only at the end of each row of 16 pixels in the block.

While only a few per cent of the possible motion vector area FSA (FIG. 1) is explored by this spiral search pattern, it is found that the estimated vectors converge upon the true motion vector within a few blocks of the picture's edge. It may be noted that inaccuracies of the motion vectors do not directly reduce the quality of the corresponding blocks in the image when decoded and displayed. Rather, inaccurate motion compensation merely reduces the degree of compression that can be achieved by the next stage in the MPEG coding process, namely spatial redundancy reduction by DCT.

Although far fewer than the number of candidate blocks involved in a full search of the area FSA (FIG. 1), 527 candidate blocks per block of the current frame is still a heavy computational task. The ordering of the candidates into a spiral brings potential savings, however, on the assumption that motion vectors are generally coherent from one block to the next. Because of this coherence, the starting vector chosen will, more often than not, be close to the desired motion vector for the current block. The ordering of candidates according to distance from the starting vector means that the best matching candidate block will tend to be found sooner rather than later in the sequence of 527 candidates.

By incorporating in the DSP programming a set of test conditions designed to detect the best candidate as soon as it appears, the search can be terminated, on average, after relatively few candidate blocks have been compared to the current block. One such condition is the setting of a threshold value of the accumulated mean squared difference. Below this threshold (which allows, among other things, for noise in the pixel data), the blocks are judged a 'perfect' match, and the spiral search is terminated. Thus, for example, the generation and evaluation of candidate vectors 'o' might end with the discovery of a 'perfectly' matching candidate block corresponding to the starting vector plus the offset $(\Delta x, \Delta y) = (3, -2)$, as illustrated in FIG. 5. Up to this point, only 48 candidate blocks have been compared.

Around the location of the best integer candidate vector 'o', represented at $(\Delta x, \Delta y) = (3, -2)$ in FIG. 5, nine crosses 'x' indicate the nine candidate vectors that will be explored to half-pixel precision by the module HLFV/MDEC/FDCT, described above with reference to FIG. 3.

Clearly, the order of candidates can be modified simply by modifying the list of offsets $(\Delta x, \Delta y)$ stored in the DSP program memory PM1. The range of offsets $\Delta x$ and $\Delta y$ can be expanded or decreased as desired, and circular or elliptical spirals or other sequences can be implemented, offering some improvement over the square and truncated spiral of FIG. 5.

Figure 6:
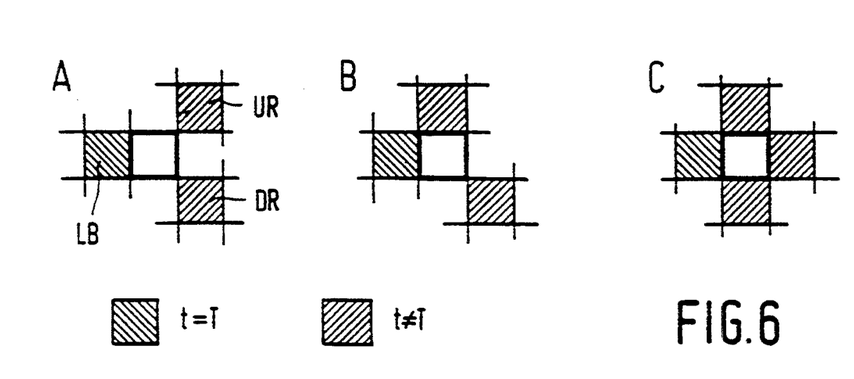
FIG. 6 shows three alternative patterns for selection of starting vectors.
Figure 7:
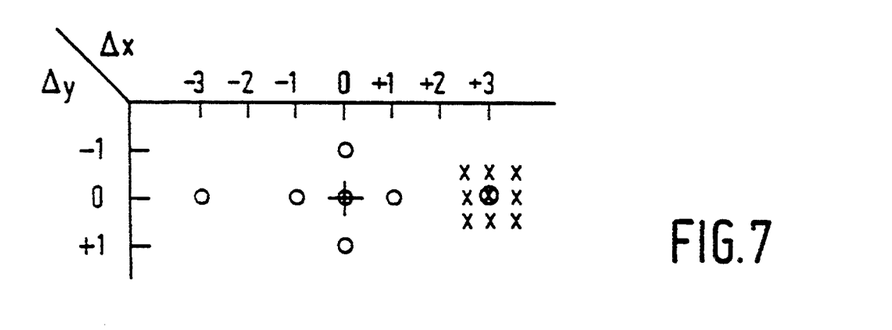
FIG. 7 illustrates tile generation of a set of candidate vectors from a starting vector in accordance with a second search strategy.

FIGS. 6 and 7 illustrate the second vector search strategy, to be applied, by way of example to blocks in frame P5, represented by the block B. The strategy to be used for frame P5 compares far fewer candidate blocks even than the limited area search strategy described above with reference to FIG. 5. This second strategy relies heavily on the choice of a few starting vectors, at least one of which should be a good prediction of the motion vector for the current block. Coupled with the rule that the vector field is better smooth than accurate, even these few candidates are found to allow a 'good' yet extremely fast motion vector estimate.

Turning to FIG. 1, the block LB(B) immediately to the left of the current block B is again known to have been processed already, because of the ordered allocation of the whole row of pixel blocks to a single DSP. The vector just estimated for block LB(B) can therefore be used as one starting vector. Unfortunately, no other neighbouring blocks in the current frame P5 are known to have been processed at this time. The strategy implemented therefore looks to the neighbouring blocks which are known to have been processed, namely neighbouring blocks in neighbouring frames, such as the current reference frame, the previous P frame P3.

For the representative block B, two blocks UR(B) and DR(B) are shaded in frame P3, these being spatially diagonally up-and-right and down-and-right neighbours of the block B respectively, as well as temporal neighbours of the current block B (frame P5). The two neighbouring blocks provide a further two starting vectors for use in estimating the motion vector of block B.

It may be noted at this point that such starting vectors may need to be scaled versions of the vectors estimated for the neighbouring blocks. For example the vector VA predicting block A in frame P3, say, from block A' in frame I0 represents motion of some image feature over a time period of three frame intervals (M=3), whereas a vector predicting block B in frame P5 from a block B' (not shown) in frame P3 represents motion over two frame intervals only. Thus the vector estimated previously for block UR(B) must be scaled by a factor of $\frac{2}{3}$ to obtain a good starting vector for the vector estimation of block B, and so forth. (If backward prediction vectors, found for blocks in a B frame, are being estimated or used as starting vectors, negative scaling factors will also be required).

FIG. 6A shows the pattern formed by the chosen neighbouring blocks around the current block, with different hatching to distinguish blocks which are spatial neighbours in the same frame (t=T) and blocks which are both spatial and temporal neighbours (t≠T). The chosen neighbour blocks generally form a triangle around the current block, with a slight horizontal bias to the distribution. The horizontal bias is in recognition of the fact that in most natural motion picture sequences, horizontal motion predominates. Choosing neighbour blocks to the left and right of the current block helps to ensure that at least one of the starting vectors will be suitable when an object moving into the current block comes from the left or the right.

FIG. 6B shows an alternative pattern of neighbouring blocks to yield three starting vectors, and FIG. 6C shows a pattern yielding four starting vectors, without horizontal bias. Always in FIG. 6 the block LB to the left of the current block is in the current frame (t=T).

Of course other patterns can be readily envisaged by those skilled in the art, each having its own merits and demerits, depending on the motion picture content, and the pattern can be changed by changing the contents of the program memories PM0, PM1 for each DSP. The pattern of FIG. 6A has been found most satisfactory in the present embodiment, for a range of picture sequences. Of course, yet different patterns will be required where the allocation of blocks to the DSPs is different to that of FIG. 4. The block rows might run vertically or even diagonally across the picture, or the subsets might be convoluted and/or interleaved for whatever reason; the principles disclosed herein can still be applied.

Having obtained three starting vectors for the current block A, the DSP in the present embodiment evaluates the block matching for a group of up to 21 candidate vectors based upon these three starting vectors.

FIG. 7 shows how seven candidate vectors, marked by circles 'o', are defined by a predetermined pattern of offsets ($\Delta x, \Delta y$) relative to the starting vector, marked '+'. The pattern of seven candidates 'o' includes the starting vector '+' itself, and again has a horizontal bias in recognition of the predominance of horizontal motion in the human environment. By applying this pattern of seven offsets to each of the three starting vectors, a set of 21 candidate vectors is obtained. Before any time-consuming block matching calculations are performed, however, the candidate set is checked to eliminate duplicates and candidates outside the legal range.

Once the best matching candidate vector 'o' has been found, again a final comparison is performed in module HLFV/MDEC/FDCT (FIG. 3) with nine half-pixel candidate vectors, marked as 'x' around the rightmost candidate vector 'o' in FIG. 7. This leads to a final encoded motion vector for the current block, estimated to half-pixel precision and derived using reconstructed pixel data.

It will be apparent to the reader that evaluating at most candidate vectors instead of the thousands required for a full search of the area FSA (FIG. 1) achieves a significant time saving, but with the disadvantage that the vector estimated for the current block may not in fact be the most accurate one. The subjective quality of images decoded after encoding by this method is good, however, because of the above mentioned observation by de Haan and Huijger that the motion vector filed should be above all smoothly-varying, rather than strictly accurate. Moreover, when object features moving in an image are many pixel blocks in size, the slowly varying vector field will tend to converge upon the most accurate vector within a few blocks after entering the object.

FIG. 1 also shows how, on the assumption that motion vectors have been estimated already for the interpolated frame B4, as well as the reference frame P3, a further four possible starting vectors are obtainable from by scaling the forward and backward vectors estimated for the UR and DR neighbouring blocks in frame B4, shaded with dotted lines in FIG. 1. Thus a total of up to six starting vectors are available in addition to the vector estimated for the preceding block LB(B). A further four or eight starting vectors could be available for the last frame in a batch of three or four frames. Rather than evaluate a set of seven candidate vectors for every one of these starting vectors, the present embodiment in fact first evaluates only the starting vectors themselves, before forming candidate sets around the starting vectors which give the best matching candidate blocks. Thus, for example, candidate sets according to the pattern of FIG. 7 may be formed on the basis of vectors estimated for the block LB(B), the block UR(B) from frame P3 and the backward prediction vector for the DR block in frame B4, all scaled as necessary to account for the different time intervals spanned.

In practice, the vector search for each batch of M frames is performed in the order indicated by circled numbers by the curved arrows at the foot of FIG. 1. By adopting this order, and with appropriate scaling, forward and backward prediction vectors of neighbouring blocks in the interpolated frames B1 and B2 are all available as candidate starting vectors when estimating motion vectors for frame P3. Similarly, the forward vectors for frame B1 can be scaled and used as starting vectors in the forward vector search for frame B2.

The remainder of the MPEG encoding process involves variation of many parameters such as the batch size M and quantisation scaling, in order to achieve a desired compromise between picture quality and data compression, as described in the MPEG specification and the article by Le Gall. These aspects are outside the scope and purpose of the present description, but it has been found that the complete MPEG coding of motion picture sequences including the motion estimation methods described above can be achieved at only 90 times real time using the four DSPs of the ANDROX system, mounted in a Sun workstation. Thus a few minutes of full motion video can be encoded for storage on CD-ROM or similar on an overnight basis, using readily available hardware in a small, compact system.

A further modification of the above strategies can be made when the encoding scheme results in some vector values being more economical to encode than others. In the particular examples of the MPEG encoding format, motion vectors are encoded in the MPEG bit stream by variable length codes, such that shorter vectors require fewer bits. Thus, when two candidate vectors have almost equal matching quality, the modified strategy will favor the vector which requires fewer bits to encode. This may necessitate a little more error information being encoded for a given block, but there will often be a net saving in encoded data which allows the image to be encoded with an overall improvement in quality.

A particular feature of the MPEG variable length codes for motion vectors is that zero displacements $\Delta x$ and by can be encoded in only one bit each. Moreover, at least in a p-type frame a block having zero motion ($\Delta x = \Delta y = 0$) can be coded with no motion information at all. This is signalled by the appropriate variable length code for "macroblock type" in the MPEG bit stream. Thus there is a great economy of data in encoding blocks which have zero motion from one frame to the next. Thus an overall improvement can be obtained when the evaluation of candidate vectors is modified to favour the zero vector, when the matching quality obtained is only slightly below that of the best candidate.

Of course, in some sequences, the zero vector will rarely be among the best candidates. It may be noted however, that certain types of motion picture sequence, for example animated cartoons, contain a large number of blocks with substantially zero motion. Moreover, large areas of these block comprise uniform areas of colour, for example blue sky. Conventional motion compensation techniques will nevertheless estimate and encode motion vectors for these blocks, if only because they contain noise information which "moves" from frame to frame. For encoding these sequences, it has been found that very significant quality improvements are afforded by use of the invention in its third aspect: if the noise level is low, the zero vector will be just one of a large number of candidate vectors for which the matching quality is the same within a relatively narrow threshold.

From reading the present disclosure, many modifications will be apparent to persons skilled in the art, in addition to those mentioned above. Such modifications may involve other features which are already known in the fields of picture encoding, motion estimation and digital signal processing and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of estimating motion vectors for pixel blocks in a frame of a digitised motion picture sequence, comprising the steps of:
   dividing the pixel blocks into at least two separate ordered subsets of pixel blocks;
   for each given pixel block in the frame, selecting at least one pixel block which is a neighbour of the given pixel block in space and/or in time,
   any selected pixel block which is a neighbour of the given pixel block in space being selected only from pixel blocks that precede the given pixel block in the same ordered subset as the given pixel block; and
   for each given pixel block in the frame, performing a vector search around at least one starting motion vector for the given pixel block to determine an estimated motion vector for the given pixel block, the at least one starting motion vector being derived from at least one previously estimated motion vector of said at least one selected pixel block which is a neighbour of the given pixel block,
   the vector searches for pixel blocks in each of the subsets being performed in parallel.

2. A method as claimed in claim 1 wherein each subset comprises a row of pixel blocks, motion vectors being estimated for the pixel blocks of the row in a predetermined sequence, a motion vector for each given block (disregarding the first block in each row) being predicted from a motion vector estimated for a pixel block which precedes the given block in said pre-determined sequence.

3. A method as claimed in claim 1 wherein the starting motion vectors for each given pixel block are based on motion vectors estimated previously for:
   a preceding block in the same subset as the given block; and
   two blocks in a neighbouring frame occupying spatial positions adjacent to the given block so as to define with said preceding block in the same subset as the given block a triangular distribution generally surrounding the given block.

4. A method as claimed in claim 1 wherein on the basis of the at least one starting motion vector, matching between the given block and a block in a previous frame is measured for an array of from 5 to 10 candidate vectors distributed around the at least one starting motion vector.

5. A method as claimed in claim 1 wherein the motion vectors are encoded in accordance with the MPEG standard as defined by the International Standards Organisation.

6. A method as claimed in claim 1 wherein for each given pixel block at least one starting motion vector is based on a motion vector estimated for a pixel block in a neighbouring frame in the motion picture sequence.

7. A method as claimed in claim 6 wherein for each given pixel block in a row, starting motion vectors are based upon a previously estimated motion vector of a preceding block in the same row and upon previously estimated motion vectors of a plurality of blocks in said neighbouring frame.

8. A method as claimed in claim 1 wherein on the basis of the at least one starting motion vector matching between the given block and a block in a previous frame is measured sequentially for an ordered series of candidate vectors surrounding the at least one starting motion vector and with generally increasing distance from the at least one starting motion vector.

9. A method as claimed in claim 8 wherein the evaluation of candidate vectors is terminated if a vector is found giving a matching better than a predetermined threshold.

10. A method as claimed in claim 1 wherein the estimated motion vector determined for the given pixel block in the step of performing a vector search depends not only on measured prediction quality of each candidate vector, but also on an encoding length in which each candidate vector would be encoded in a resultant data stream encoding the motion picture sequence.

11. A method as claimed in claim 1 wherein zero motion vector has a shortest encoding length and wherein a candidate vector which is zero will be favoured in the selection of each estimated motion vector.

12. A method of estimating a motion vector for a given block of pixels in a frame of a digitised motion picture sequence, which estimated motion vector is to be encoded in a data stream encoding the motion picture sequence, the method comprising the steps of:
   generating a set of candidate motion vectors for evaluation;
   determining a quality of prediction value for each of the candidate motion vectors;
   selecting candidate motion vectors having a quality of prediction value within a pre-determined threshold of a highest quality of prediction value for the candidate motion vectors;
   determining an encoding length for each of the selected candidate motion vectors, the encoding length being dependent on the value of the selected candidate motion vector; and
   selecting as the estimated motion vector for the given block of pixels the selected candidate motion vector having a shortest encoding length.

13. An apparatus for estimating motion vectors for pixel blocks in a frame of a digitized motion picture sequence, said apparatus comprising in combination:
 a) means for dividing the pixel blocks into at least two separate ordered subsets of pixel blocks;
 b) means for selecting for each given pixel block in the frame, at least one pixel block which is a neighbor of the given pixel block in space and/or in time, wherein any selected pixel block which is a neighbor of the given pixel block in space is selected only from pixel blocks that precede the given pixel block in the same ordered subset as the given pixel block; and
 c) means for performing, for each given pixel block in the frame, a vector search around at least one starting motion vector for the given pixel block to determine an estimated motion vector for the given pixel block, the at least one starting motion vector being derived from at least one previously estimated motion vector of said at least one selected block which is a neighbor of the given pixel block, wherein the vector searches for pixel blocks in each of the subsets is performed in parallel.

* * * * *